United States Patent Office 3,239,406
Patented Mar. 8, 1966

3,239,406
CHEMILUMINESCENT STRUCTURES AND
THEIR PREPARATION
Donald D. Coffman, West Chester, Pa., and Hilmer E. Winberg, Wilmington, Del., assignors to E. I. du Pont de Nemours and Company, Wilmington, Del., a corporation of Delaware
No Drawing. Filed Oct. 17, 1962, Ser. No. 232,335
16 Claims. (Cl. 161—167)

This invention relates to a chemiluminescent structure and its preparation. More particularly, it is concerned with a chemiluminescent tape useful as a marker by virtue of its ability to chemiluminesce in air.

It has now been discovered that a multilayer or sandwich-like structure can be prepared which upon exposure to air chemiluminesces for varying periods of time and at different levels of illumination, depending upon the type and amount of chemiluminescent composition incorporated in the structure. This structure or tape comprises (1) at least one layer or surface having ability to adhere to other surfaces, preferably by virtue of an adhesive undercoat, and having at least a surface impregnated with a chemiluminescent compoistion containing at least one peraminoethylene, and (2) a strippable film overcoat or a removable envelope to protect the chemiluminescent peraminoethylene-containing composition from exposure to oxygen prior to use. Chemiluminescence is brought about by removal of the strippable overcoat or envelope to allow the ingress of air.

In one important aspect of the invention, the tape is in the form of a multilayer sandwich comprising (1) a flexible self-supporting layer or substratum having a pressure-sensitive adhesive undercoat, (2) an intermediate layer which is in adherent contact with the substratum and which comprises a porous film saturated with a chemiluminescent composition containing one or more peraminoethylenes of the type described hereinafter, and (3) a strippable protective layer in adherent contact with the intermediate layer.

In another important and closely related aspect of the invention, the intermediate layer is a thickened chemiluminescent composition or gel of the type described and claimed in the copending application of Hilmer E. Winberg, Serial No. 174,404, filed February 20, 1962. These thickened chemiluminescent gels comprise, in addition to the chemiluminescent peraminoethylene compound, about 1–50% by weight of a compatible nonquenching thickening agent such as, for instance, colloidal silica or polyisobutylene. A nonquenching solvent such as, for example, cyclohexane may additionally be present. By virtue of the controllable degree of thickness achieved in the thickened chemiluminescent gels through variations in the relative concentrations of the thickening agents, means for simply and effectively controlling the rate of oxidation of the peraminoethylenes is afforded. It is not known whether this rate-controlling action functions through control of the transpiration of the necessary oxygen into the thickened gels or by control of the rate of exudation of the aminoethylenes to the surface. In any event, whether the control functions through one or both of the just-described mechanism, the control on the rate and intensity of the luminescence is fundamental, varying with decreased intensity and increased time of the luminescence as the viscosity of the thickened gels increases.

In still another important embodiment of the invention, the intermediate layer can comprise a waxy layer containing the chemiluminescent peraminoethylene, or the waxy layer can itself serve as the self-supporting substration or base layer. Hydrocarbon waxes such as Aristowax and ozokerite are preferred. Waxy blends involving these and other waxes and semisolid hydrocarbons such as petrolatum can be used advantageously.

A further embodiment of this invention is a structure or tape in which the multiple components or members heretofore mentioned have been integrated into two elements: (1) a self-supporting, inherently adhesive flexible composition in film form that is chemiluminescent by virtue of the peraminoethylene contained therein, and (2) a removable, protective envelope which excludes ingress of air prior to use. This two-component embodiment, as well as the others, can exist in the form of thin tapes, i.e., less than ⅛ inch thick, or in the form of substantially thicker structures, say, for instance, tapes up to half-inch or more in thickness.

The chemiluminescent peraminoethylene compound or compounds may be held in the chemiluminescent member or element by one or more of several methods. In the case of porous films, insoluble in the peraminoethylene compounds, the film may be simply saturated by the chemiluminescent compounds. The microscopic voids of an open-cell structure type of porous film may be filled with the compounds, or the peraminoethylene compounds may be mechanically adsorbed at the surface or dispersed or imbedded throughout the entire layer, for example, in the nap of fabric. The chemiluminescent peraminoethylene compounds may be contained as a solution in those substrates in which it is compatible. These would comprise, as examples, the thickened chemiluminescent gels and the wax compositions as heretofore mentioned.

In the tapes of this invention, the peraminoethylenes used are of the formula

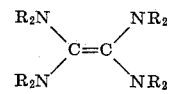

in which the R's which can be alike or different, are straight or branched chain alkyl or cycloalkyl hydrocarbon radicals of from 1–10 carbons each, preferably no more than five carbons each, which can be joined pairwise on one nitrogen to form 3–5 membered monoaza heterocycles and on two nitrogens to form 3–7 membered diaza heterocycles. These tetrakis-(disubstitutedamino) ethylenes and their preparation are more fully disclosed and claimed in the coassigned, copending application of Hilmer E. Winberg, Serial No. 174,404, filed on February 20, 1962, which in turn is a continuation-in-part of U.S. Serial No. 836,062, filed August 26, 1959, now abandoned.

The first member of this series of peraminoethylenes, namely, tetrakis(dimethylamino)ethylene can be prepared by the reaction of dimethylamine and chlorotrifluoroethylene, as reported by Pruett, et al., J. Am. Chem. Soc., 72, 3646 (1950). However, this Pruett et al. method of preparation does not proceed for the other members of the series. In contrast, they are prepared by the ready reaction between the requisite basic secondary amine and any amide acetal, i.e., any disubstitutedaminodihydrocarboxymethane in accord with the following stoichiometry:

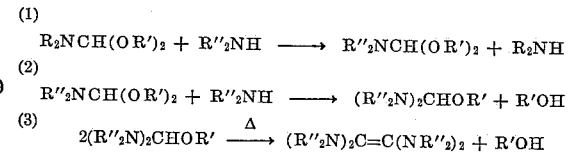

wherein the R's, which can be alike or different, are monovalent alkyl or cycloalkyl radicals, generally of no more than eight carbons each, which can be together joined (in a divalent radical) to form with the intervening nitrogen a heterocycle of from three to seven ring members; the R"s which can also be alike or different, or together joined, are monovalent (or divalent) alkyl, aryl, aralkyl, alkaryl, or cycloalkyl radicals, generally of no more than eight carbons each, and when together joined, form with the two oxygens and intervening carbon a 1,3-dioxaheterocycle of from five to seven ring members; and the R'''s which can also be alike or different or together joined, are monovalent (or divalent) alkyl or cycloalkyl hydrocarbon radicals of no more than eight carbons each, and, in the case of the divalent radicals, no more than two to six carbons per divalent radical. In any event, when two R'''s are together joined on the same nitrogen, they form with the indicated amine nitrogen a monoaza heterocycle of three to five members, or when they are on different nitrogens on the same carbon, they form with the indicated two amine nitrogens a diaza heterocycle of from three to seven ring members.

The adsorbent (or intermediate) layer or member containing the chemiluminescent material can be a waxy layer as herebefore mentioned, or any of a variety of porous substances, such as, for instance, cellulose films, viscose, and paper. More preferably, it is a film of a synthetic hydrophobic vinyl-or vinylidene-type organic addition polymer. Such films are fully disclosed and claimed in U.S. 2,957,791, which issued on October 25, 1960, to Max F. Bechtold. Particularly perferred porous films are those prepared from vinyl chloride and a lower alkyl acrylate, such as methyl or ethyl acrylate, and terpolymers of acrylonitrile, isobutylene and vinylidene chloride. Another example of an operative film is the 75/25 acrylonitrile/isobutylene copolymer. Still other useful polymers are those of vinyl chloride, vinylidene chloride, methacrylonitrile and hydrocarbon olefins and copolymers of such monomers and of acrylonitrile with each other or with other monomers such as butadiene, isobutylene and an acrylate, such as ethyl acrylate, and methacrylate esters in which the latter monomers are present in minor amounts. Particularly useful copolymers include acrylonitrile/isobutylene copolymer having 23-30% of isobutylene and polymers containing major amounts of units of a monovinylidene monomer, i.e., one that contains a negative (electron attracting) or polar group, particularly a monovinyl monomer such as vinyl chloride or acrylonitrile. Especially useful polymers contain units of aliphatic hydrocarbons, e.g., of olefins such as ethylene, propylene, isobutylene, butadiene and the like.

The base film or support member utilizable in this invention can be paper or a polymeric film which may consist of such well-known film-forming materials as regenerated cellulose and cellulose derivatives, e.g., cellulose propionate, cellulose acetate butyrate; polyvinyl chloride, polyvinyl chloride/acetate; polyethylene and other polyolefins; polyvinyl acetals, e.g., from formaldehyde and acetaldehyde; polyamides; super polyesters from dicarboxylic acids and dihydric alcohols, e.g., oriented sheets of polyethylene terephthalates having melting points above 200° C. The latter is the preferred support material because of its strength, stability and other desirable physical properties. Other suitable supports are glass, metals, such as tin, lead, and aluminum foil, closely woven fabrics, non-woven fabrics having interbonding fibers, and "Mylar" polyethylene terephthalate with a 3-20 mil deep polyester flock. The support is, of course, preferably, flexible.

Any suitable normally tacky and pressure-sensitive adhesive useful in masking tapes can be used for the adhesive undercoat. Such adhesives are generally compounded from a composition of synthetic rubber or similar elastomeric polymer, and a resinous component compatible with the rubber and adapted to impart tack to the adhesive composition, together with suitable amounts of various types of additives such as conventional fillers, antioxidants, etc. The elastomer component, tackifying resin, and fillers, when used, are proportioned to obtain in the adhesive properties of high internal strength and cohesiveness and high adhesiveness.

Examples of specific adhesive compositions useful in forming the novel tapes in accordance with this invention are given in U.S. Patents 2,177,627 and 2,963,386.

In preparing the tapes of this invention, the adhesive can be applied to the support film in any conventional manner, as, for example, by calendering, reverse roll-coater, knife-coater, and the like.

The removable protective layer or envelope can be made of any of the film or intermediate layer materials listed above. The composition of this overlying facing member adapted to be removed prior to use is not critical since it is discarded after removal. The surface of the protective layer may be coated with a release agent, e.g., polyethylene, polytetrafluoroethylene or a silicone or wax, to facilitate its removal from the adhesive surface. Generally speaking, the surface of the facing or protective member in contact with the underlying adhesive coating comprises a film of organic material that is substantially inert with respect to the adhesive and releasable by the adhesive when the facing member is removed without separating the adhesive undercoat from the chemiluminescent component and without substantially imparing the smooth surface characteristics of the adhesive coating existing at the interface prior to removal of the facing member. Envelopes of the type used in keeping medicinal plastic strips or adhesive surgical dressing units free from contamination can be utilized in this invention.

In one important process embodiment of this invention, a waxy layer containing a chemiluminescent peraminoethylene is calendered on a supporting film, followed by undercoating said film with a pressure-sensitive adhesive and overcoating with strippable protective layer.

The marking tapes of this invention may be packaged in roll form, or a number of short integral strips may be boxed or otherwise packaged in convenient numbers or sizes.

Application of the tape to an object is accomplished in one of the following manners: The user grasps the integral tape, which may be cut from a continuous roll of tape, and places the strip, adhesive side down, on the desired object or objects. The strip may be smoothed down with the fingers to obtain smooth bubble-free adhesion. Then the protective overcoat is removed to permit the ingress of air. Or just prior to placing the strip of tape on the desired object, the user may perforate, tear, pull the rip cord, or otherwise remove the protective overcoat or envelope and then proceed as above.

A further understanding of the invention will be obtained from the following examples, wherein the parts are given by weight unless otherwise specified.

*Example I*

A nocturnal marking tape is prepared by wetting with tetrakis(dimethylamino)ethylene under nitroge, a 75/25 vinyl chloride/methyl acrylate opaque, pressure-clarifiable film on a "Mylar" polyethylene terephthalate base containing an adhesive undercoat. "Scotch" coated masking tape is placed on top of the saturated film to protect it from air. On stripping the "Scotch" tape overcoat from the assembly, the tetrakis(dimethylamino)ethylene in the porous film chemiluminesces. To a dark-adapted eye, a one-inch-wide strip of the marking tape so prepared is visible at a distance of at least fifty feet for a period of at least thirty minutes.

*Example II*

A noctural marking tape was prepared by saturating with tetrakis(dimethylamino)ethylene under nitrogen, a 75/25 vinyl chloride/methyl acrylate opaque, porous, pressure-clarifiable film 12 mils thick on "Mylar" polyethylene terephthalate base containing an adhesive undercoat. The saturated film was protected from air by covering it with a 4-mil polyethylene film which, in turn, was covered by a wider masking tape.

On stripping the masking tape and polyethylene film from the asembly, the tetrakis(dimethylamino)ethylene in the porous film chemiluminesced brightly. A one-inch square of the tape adhering to a vertical surface in a semi-darkened room by virtue of its chemiluminescence was readily visible at a distance of 25 feet for at least one and one-half hours.

The preparation of the opaque, porous, pressure-clarifiable film used in preparing the tape of this example is fully described and claimed in the copending application of H. B. Stevenson, Serial No. 176,134, filed February 27, 1962, now abandoned. In brief, the process comprises (a) Coating a non-fibrous support with a solution of a water-insoluble linear polymer in a water-soluble dialkylamide solvent, said solution containing a hydroxyl-containing liquid non-solvent for said polymer boiling at a temperature not more than 100° C., said coating containing at least 45% but not more than 97% of the amount of non-solvent necessary to form a hazy solution, and (b) Treating the coated element, before there has been any significant evaporation of the solvent, in a non-solvent for the polymer to extract said dialkylamide, and (c) Removing the non-solvent from the coating.

*Example III*

Using the method described in Example II, a similar type of structure was prepared using blotting paper, which was 36 mils thick, as the absorbent layer for the chemiluminescent composition. On exposure to air after removal of the protective overcoat, the tape chemiluminesced in a manner similar to the tape of Example II. After one and one-half hours' exposure to air, a one-inch square of the tape was readily visible in the dark at 25 feet.

*Example IV*

A nocturnal marking tape was prepared as given in Example II except that the tetrakis(dimethylamino)-ethylene was replaced by a homogeneous composition composition comprising 8.6 parts of tetrakis(dimethyl-amino)ethylene, 7.3 parts of decane and 0.2 part of polyisobutylene (Vistanex L120). On removal of the protective film from the air-sensitive layer in the dark, the tape immediately became visible because of chemiluminescence. The chemiluminescence persisted with sufficient brightness to render a one-inch square of the tape easily visible at 25 feet in semidarkness, after one and one-half hours' exposure to air.

*Example V*

A nocturnal marking tape was prepared as given in Example II except that the tetrakis(dimethylamino)-ethylene was replaced by a homogeneous composition comprising 75 parts of tetrakis(dimethylamino)ethylene and 25 parts of $1,1',3,3'$-tetraethyl-$\Delta^{2,2'}$-bi(imidazolidine). On removal of the polyethylene-masking tape overcoat from the assembly, the mixture of peraminoethylenes in the porous film chemiluminesced brightly.

*Example VI*

A nocturnal marking tape was prepared as given in Example II except that the tetrakis(dimethylamino)-ethylene was replaced by $1,1',3,3'$-tetrabutyl-$\Delta^{2,2'}$-bi(imidazolidine) (B.P. 185° C. under 0.2 mm. of mercury pressure, prepared as disclosed in the copending application of Hilmer E. Winberg, Serial No. 174,404, filed February 20, 1962). Exposure of the peraminoethylene-containing vinyl chloride/methyl acrylate film to air by removal of the polyethylene-masking tape overcoat caused the assembly to appear orange-yellow colored in the dark as a result of chemiluminescence.

*Example VII*

A composition comprising 10 parts of polyisobutylene (Vistanex L120), 10 parts of a hydrocarbon wax (Aristowax 143–150) and 2 parts of zinc oxide was prepared by mixing on a rubber mill. A layer of this waxy composition ½" wide, 3" long and $\frac{1}{16}$" thick was coated on a strippable glazed cloth (holland release cloth) and approximately 0.25 part of tetrakis(dimethylamino)ethylene was spread on the strip under nitrogen. The amino-ethylene was absorbed by the waxy layer which was thereby rendered tacky. A ½" x 1½" portion of the composite, adhering to cardboard in a vertical position, when exposed to air in a dark room was visible as a bright rectangular spot whose visibility persisted for at least one-half hour.

In the embodiment of the invention illustrated by the above example, the composite is preferably surrounded by an oxygen-impermeable envelope or sealed wrapper, which optionally may containing a rip-cord for convenience in opening.

*Example VIII*

A 1–3 mil layer of a composition comprising 3 parts of ozokerite, 5 parts of a hydrocarbon wax (Aristowax 143–150), 3 parts of petrolatum (White Perfecta), 1 part of polyisobutylene (Vistanex LM–MS) and 3.44 parts of tetrakis(dimethylamino)ethylene was applied under nitrogen to the rough surface of a 1.3-mil aluminum foil containing an adhesive undercoat. The air-sensitive layer was protected by a second smooth aluminum foil overcoat. A strip of the tape approximately 1½" wide by 3" long was stuck to a vertical surface by means of the adhesive undercoat. When the protective smooth aluminum foil overcoat was removed at night, the oxyluminescence of the active layer rendered the tape visible from a distance of at least 60 feet for at least 1½ hours.

*Example IX*

The composition of Example VIII was applied under nitrogen to a 1" wide woven glass fiber tape 9 mils thick which contained an adhesive undercoat. The air-sensitive layer was protected by covering it with a 4-mil film of polyethylene held in place with a wider strip of masking tape. When the protective layers were removed in a dark room, the tape was observed to give a pale luminescence which persisted for at least 15 minutes.

*Example X*

A nocturnal marking tape was prepared as given in Example II except that the opaque, porous, pressure-clarifiable film was replaced by a cellulose sponge $\frac{1}{16}$" thick. A 1½" x 2¼" strip of the tape adhering to a cardboard surface in a dark room was visible as a pale luminescence which persisted for at least 15 minutes.

The tapes of this invention are useful for nocturnal identification of objects, personnel and areas, and for nighttime signalling. They provide useful distress or warning signals. Such tapes may also be useful as shipboard equipment for liferafts, lifeboats, and the like. They are also particularly convenient for illuminating designated areas on roadways during temporary emergency conditions such as automobile accidents or other obstructions to traffic, and for nighttime designation of travel routes.

Since the chemiluminescent products of the invention are really amenable to shaping, they can be formed, e.g., the tapes can be cut into numerals or letters for display purposes, such as, for instance, on billboards, mailboxes, porches or doors of homes, and the like.

An outstanding advantage of the nocturnal marking tapes of this invention is that they have not only the property of very high initial brightness, but they also retain a reasonably high level of illumination for appreciable periods of time. Furthermore, in the event it is desirable to quench the chemiluminescence, i.e., to stop the evolution of light during the oxidation of the tetrakis(dihydrocarbylaminosubstituted)ethylene, this can be readily done by spraying or dousing the tape with such chemicals as aliphatic ketones, e.g., acetone, cyclic aliphatic ketones such as cyclohexanone, aromatic hydrocarbons, acids such as dry HCl, and certain individual compounds as ethylenediamine, N,N,N',N'-tetramethylurea, and N,N,N',N'-tetramethyloxamide.

Another important property exhibited by the chemiluminescent tapes of the present invention is their ability to be applied to a wide variety of surfaces while still maintaining a desired level of chemiluminescence. The tapes can be applied to a wide variety of objects, such as, for instance, trees, vehicles, metal surfaces, unpainted and painted surfaces and glass. They may also be applied to such relatively porous surfaces as cloth, e.g., boat sails, parachutes, life jackets and the like.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A chemiluminescent structure comprising (a) a self-supporting layer with an adhesive surface, said self-supporting layer being further characterized by having at least a surface impregnated with a chemiluminescent composition containing at least one tetrakis(disubstitutedamino)ethylene of the formula

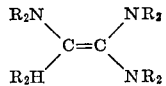

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, and (b) a removable protective member surrounding said chemiluminescent surface.

2. A chemiluminescent tape comprising a supporting layer, an intermediate layer in adherent contact therewith containing a chemiluminescent composition comprising at least one tetrakis(disubstitutedamino)ethylene of the formula

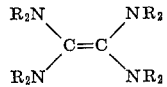

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, a strippable film overcoat surrounding said intermediate layer, and a pressure-sensitive adhesive in adherent contact with the underside of the supporting layer.

3. A chemiluminescent tape comprising a porous film saturated with a chemiluminescent composition containing at least one tetrakis(disubstitutedamino)ethylene of the formula

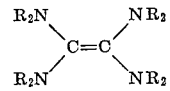

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, a base layer supporting said porous film and having an adhesive undercoat, and a strippable film overcoating said porous film.

4. An adhesive chemiluminescent sheet material comprising a flexible sheet backing having a layer of pressure-sensitive adhesive adherent to one side thereof and a waxy layer containing a chemiluminescent composition on the other side, said chemiluminescent composition containing at least one tetrakis(disubstitutedamino)ethylene of the formula

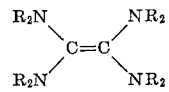

wherein the R's are selected from the group consisting of monovalent alkyl and cycloalkyl of up to 10 carbons, divalent alkylene joined to the other R attached to the same N to form a 3–5 membered monoazo heterocycle and divalent alkylene joined to an R attached to a second N to form a 3–7 membered diaza heterocycle, and being protected from premature exposure to air by a removable overcoat.

5. A tape comprising a flexible substratum, in adherent contact therewith an intermediate stratum comprising a chemiluminescent gel containing at least one peraminoethylene compound of the formula

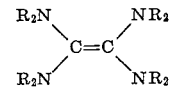

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, said intermediate stratum being surrounded by a removable film overcoat, and an adhesive undercoat attached to the substratum.

6. A chemiluminescent tape comprising a self-supporting, inherently adhesive, flexible chemiluminescent layer containing at least one tetrakis(disubstitutedamino)ethylene of the formula

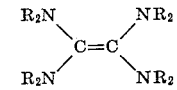

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, and a strippable oxygen-impermeable film overcoat surrounding said chemiluminescent layer.

7. A tape as set forth in claim 2 wherein said supporting layer is a film of polyethylene terephthalate.

8. A tape as set forth in claim 2 wherein said intermediate layer is an opaque pressure-clarifiable film of a synthetic hydrophobic vinylidene-type organic addition polymer.

9. A tape as set forth in claim 2 wherein said intermediate layer is a copolymer of vinyl chloride and ethyl acrylate.

10. A tape as set forth in claim 2 wherein the intermediate layer is impregnated with tetrakis(dimethylamino)ethylene.

11. A tape as set forth in claim 2 wherein the intermediate layer is impregnated with 1,1',3,3'-tetraethyl-$\Delta^{2,2'}$-bi(imidazolidine).

12. A tape as set forth in claim 2 wherein the intermediate layer is impregnated with a mixture of tetrakis(dimethylamino)ethylene and 1,1',3,3'-tetraethyl-$\Delta^{2,2'}$-bi(imidazolidine).

13. A tape as set forth in claim 6 wherein the tetrakis(disubstitutedamino)ethylene is tetrakis(dimethylamine)ethylene.

14. Process for preparing a chemiluminescent tape which comprises calendering on a supporting layer having an adhesive undercoat a chemiluminescent composition containing at least one tetrakis(disubstitutedamino)-ethylene of the formula

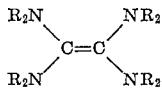

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, and thereafter surrounding the chemiluminescent layer with a strippable film overcoat.

15. Process for preparing a chemiluminescent tape which comprises wetting under non-oxidizing conditions a porous film with a tetrakis(disubstitutedamino)ethylene of the formula

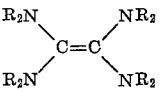

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, said porous film being in adherent contact with a base film having an adhesive undercoat, and thereafter placing a strippable protective film on top of the saturated porous film.

16. Process for preparing a chemiluminescent structure which comprises impregnating under non-oxidizing conditions at least a surface of a self-supporting, inherently adhesive, layer with at least one tetrakis(disubstituted-maino)ethylene of the formula

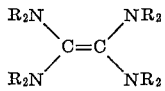

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, and surrounding said surface under non-oxidizing conditions with a removable, oxygen-impermeable envelope.

References Cited by the Examiner

UNITED STATES PATENTS 2,387,512  10/1945  Hilberg _____ 252—301.2
2,941,005   6/1960  Mahan _____ 260—583

OTHER REFERENCES

Pruett et al., J.A.C.S., 72, 3649, August 1950.

WILLIAM D. MARTIN, *Primary Examiner.*

REUBEN EPSTEIN, *Examiner.*